United States Patent [19]

Nagano et al.

[11] 4,145,499

[45] Mar. 20, 1979

[54] PROCESS FOR POLYMERIZING VINYL CHLORIDE

[75] Inventors: Mineo Nagano; Shigeru Awazawa; Tatsuhiko Niwa, all of Yokkaichi, Japan

[73] Assignee: Toyo Soda Manufacturing Co., Ltd., Yamaguchi, Japan

[21] Appl. No.: 901,243

[22] Filed: Apr. 28, 1978

[30] Foreign Application Priority Data

May 6, 1977 [JP] Japan .................................. 52-51253
Jul. 26, 1977 [JP] Japan .................................. 52-88863

[51] Int. Cl.$^2$ ........................... C08F 2/02; C08F 6/26; C08F 14/06
[52] U.S. Cl. ................................. 526/201; 526/344.1; 526/344.3; 526/345; 526/909; 526/913
[58] Field of Search ........................ 526/201, 344, 345

[56] References Cited

U.S. PATENT DOCUMENTS

| | | | |
|---|---|---|---|
| 3,578,646 | 5/1971 | Moberly et al. | 526/345 |
| 3,625,932 | 12/1971 | Green | 526/345 |
| 3,692,718 | 9/1972 | Golstein | 526/345 |
| 3,875,130 | 4/1975 | Kemp | 526/345 |
| 3,933,771 | 1/1976 | Eastman et al. | 526/345 |
| 3,945,958 | 3/1976 | Koyanagi et al. | 526/345 |
| 4,029,863 | 6/1977 | Lemper | 526/345 |

FOREIGN PATENT DOCUMENTS 30290 1971 Japan.

*Primary Examiner*—John Kight, III
*Attorney, Agent, or Firm*—Cushman, Darby & Cushman

[57] ABSTRACT

Disclosed is a process for polymerizing vinyl chloride, alone or in combination with a comonomer, in the vapor phase maintained at a pressure lower than the vapor pressure of the monomer at the polymerization temperature employed, and in the presence of the specified seed vinyl chloride polymer particles. The seed polymer particles used are prepared by polymerizing vinyl chloride, along or in combination with a comonomer, under bulk conditions, in the presence of 0.001% to 2% by weight, based on the weight of the monomer, of a cellulose ether soluble in the monomer.

12 Claims, No Drawings

PROCESS FOR POLYMERIZING VINYL CHLORIDE

This invention relates to an improvement in a process for polymerizing vinyl chloride, alone or with comonomers. More particularly, it relates to a process for polymerizing vinyl chloride under bulk conditions, and further to a process for polymerizing vinyl chloride in the vapor phase in the presence of seed particles of a vinyl chloride polymer obtained by such bulk polymerization.

Several proposals have been heretofore made to polymerize vinyl chloride in the vapor phase. For example, Japanese Patent Publication No. 30,290/71 discloses the polymerization of vinyl chloride, wherein vinyl chloride is polymerized at a pressure lower than the saturated vapor pressure of vinyl chloride at the polymerization temperature employed. It is referred to in this patent publication that the polymerization of vinyl chloride is advantageously carried out in the presence of finely divided seed particles of polyvinyl chloride. However, this proposed process is not advantageous in that the resultant vinyl chloride polymer particles are not uniform in their size and shape. That is, seed particles of polyvinyl chloride grow during the vapor phase polymerization and some of the seed particles become coarse particles of undesirably large size. This undesirable phenomenon is found popularly particularly when the seed particles of polyvinyl chloride are produced by a convention polymerization procedure in a commercial scale, irrespective of the type of polymerization, i.e. suspension or bulk. Such coarse particles must be removed from the polymer product for use in the production of shaped articles of good quality, and thus, the formation of coarse particles leads to reduction in the yield of polymer product.

If the seed polyvinyl chloride particles used in the vapor phase polymerization are minute and uniform in size, the resultant polymer product would be satisfactory in the uniformity in particle size. It is, however, difficult to prepare minute and uniform polyvinyl chloride particles, for example, by suspension polymerization without the use of a specially devised complicated polymerization apparatus.

It also has been proposed in U.S. Pat. No. 3,625,932 to polymerize vinyl chloride in the vapor phase in the presence of a seed vinyl chloride polymer product obtained by bulk polymerization and with a low conversion. However, the resultant polyvinyl chloride is still not completely satisfactory in its uniformity of size and shape.

A main object of the present invention is to provide a process for producing a vinyl chloride polymer by a vapor phase polymerization procedure, which polymer is of improved uniformity in the particle size and shape.

Another object is to provide a process for producing a vinyl chloride polymer by a bulk polymerization procedure, which polymer is minute and uniform in the particle size and particularly suitable for use as seed particles in the above-mentioned vapor phase polymerization of vinyl chloride.

Other objects and advantages of the present invention will be apparent from the following description.

In accordance with the present invention, there is provided a process for polymerizing monomer selected from the group consisting of vinyl chloride and combinations of at least about 90% by weight of vinyl chloride with not more than about 10% by weight of at least one copolymerizable monoethylenically unsaturated monomer, in the vapor phase maintained at a pressure lower than the vapor pressure of the monomer at the polymerization temperature employed, and in the presence of seed vinyl chloride polymer particles, the seed vinyl chloride polymer being a homopolymer or a copolymer comprised of at least about 90% by weight of units derived from vinyl chloride and not more than about 10% by weight of units derived from at least one copolymerizable monoethylenically unsaturated monomer, wherein the improvement comprises: using, as the seed vinyl chloride polymer particles, a vinyl chloride polymer prepared by the bulk polymerization conducted in the presence of 0.001% to 2% by weight, based on the weight of the monomer, of a cellulose ether soluble in the monomer.

Both the monomer used in the bulk polymerization for preparing the seed vinyl chloride polymer particles and the monomer used in the vapor phase polymerization may be vinyl chloride only or combinations of vinyl chloride with a copolymerizable monoethylenically unsaturated monomer or monomers. Such copolymerizable monomer includes, for example, ethylene, propylene, vinyl acetate, vinyl propionate and vinyl butyrate. Furthermore, both the bulk polymerization and the vapor phase polymerization may be graft copolymerization wherein vinyl chloride is graft-polymerized onto a polymer soluble in vinyl chloride, which polymer includes, for example, an ethylene-vinyl acetate copolymer and polymethyl methacrylate. These copolymerizable monomers and polymers onto which vinyl chloride is graft-polymerized may be used either alone or in combination. The amounts of these copolymerizable monomers and polymers may be such that the resultant copolymers, including graft copolymers, are comprised of at least about 90% by weight of units derived from vinyl chloride and not more than about 10% by weight of units derived from monomer or monomers other than vinyl chloride.

The polymerization for preparing the seed polymer particles is effected under bulk conditions in the presence of a cellulose ether. The polymerization temperature may be conventional, i.e. in the range of from 40° to 80° C. The polymerization time is preferably in the range of from 30 minutes to four hours, although it varies depending upon the particular polymerization initiator used. The polymerization time should be such that the polymerization is terminated while a salient amount of liquid vinyl chloride monomer still remains in the polymerization mixture. Stating this in more detail, it is preferable that the polymerization is terminated at a conversion of below 20% by weight, particularly about 3% to about 10% by weight. The term "conversion" used herein means the ratio by weight of the polymer converted from vinyl chloride to the vinyl chloride charged. When the conversion upon the termination is excessively large, the resultant polymer particles are neither minute nor uniform in size and not satisfactory as the intended seed polymer particles. This is because the polymerization proceeds in its last stage in a state such that no salient amount of liquid monomer is present in the polymerization mixture.

The type of cellulose ether used in the bulk polymerization is not particularly limited, provided that the cellulose ether is soluble in vinyl chloride monomer. The cellulose ether includes, for example, those which have the hydroxyl groups substituted with an alkylating or hydroxyalkylating agent having 1 to 3 carbon atoms, such as methyl cellulose, ethyl cellulose, propyl cellulose and glycol cellulose. Of these, methyl cellulose and ethyl cellulose are preferable.

The cellulose ether used possesses a degree of substitution of preferably 0.1 to 2.8, more preferably 0.8 to 2.8. By the term "degree of substitution" used herein is meant the average number of the hydroxyl groups per anhydro glucose unit in the cellulose molecule.

The amount of the cellulose ether used is 0.001% to 2.0% by weight, preferably 0.005% to 0.1% by weight. The intended polymer product can be obtained even in the presence of a minor amount of cellulose ether, but the presence of an excessively large amount of cellulose ether tends to result in a final vapor phase polymerization product, a shaped article made from which is poor in transparency and not completely colorless, and possesses undesirable fish-eyes on the surface.

The cellulose ether may be incorporated in the bulk polymerization system in any convenient manner. The cellulose ether may be incorporated, for example, into the monomer charge prior to the initiation of polymerization, or continuously or intermittently into the polymerization mixture during the polymerization, particularly in the initial stage of polymerization. The cellulose ether may be incorporated either in the form of finely divided solid particles or in the form of a solution dissolved in a monomer to be polymerized or other suitable solvents.

A polymerization initiator used in the bulk polymerization and the vapor phase polymerization hereinafter described in detail may be selected from radical initiators which are popularly employed in the polymerization of vinyl chloride. A preferable initiator is soluble in vinyl chloride, and includes, for example: organic peroxides, such as acetyl peroxide, lauroyl peroxide, 3,5,5-trimethylhexanoyl peroxide, acetylcyclohexylsulfonyl peroxide, t.-butylperoxybutyrate, t.-butylperoxypivalate, t.-butylperoxyneodecanoate, diisopropylperoxydicarbonate, di-sec.-butylperoxydicarbonate, bis-(4-t-butylcyclohexyl)peroxydicarbonate, di-3-methoxybutylperoxydicarbonate and di-2-ethylhexylperoxydicarbonate, and; azo compounds, such as 2,2'-azobis-(2,4-dimethylvaleronitrile), 2,2'-azobis-(4-methoxy-2,4-dimethylvaleronitrile) and azobisisobutyronitrile. These initiators may be used alone or in combination.

The amount of the polymerization initiator used in the bulk polymerization and the vapor phase polymerization is usually in the range of from 0.0002% to 5% by weight, more preferably from 0.001% to 0.1% by weight, based on the weight of the monomer. The polymerization initiator may be added to the polymerization system in any convenient manner. For example, it may be added to the monomer charge prior to the initiation of polymerization, or continuously or intermittently to the polymerization mixture during polymerization. The initiator may be added as it is or in the form of a solution dissolved in a monomer or a suitable diluent.

The bulk polymerization may be carried out in either a batch-wise or continuous manner. The polymerization reactor may be either tank-type or tube-type, provided that the polymerization mixture is maintained in a fluidized state over the entire period of polymerization. The manner by which the polymerization mixture is fluidized is not particularly limited. For example, the fluidizing means may be a mechanical seal type stirrer, an electromagnetic stirrer, or an orifice- or Venturi tube-type fluidizing means. A rotational stirrer provided with stirring wings, such as paddles, is advantageously employed, and the shape of the stirring wings is not particularly critical.

In the bulk polymerization, suitable additives such as fish-eye suppressing agent, stabilizer, lubricant, plasticizer and emulsifier may be added, in addition to cellulose ether, to the polymerization system as long as the additives do not exert a harmful influence upon the polymerization. Such additives include, for example, higher alcohols, organometallic compounds, epoxy compounds, polyethylene and other waxes, sorbitan esters and inorganic metallic compounds. These additives may be used along or in combination. When these additives are used in a conventional bulk polymerization procedure, they are liable to exert a harmful influence upon the polymerization, e.g. cause blocking of the polymerization mixture. However, such trouble is not caused in the bulk polymerization of the invention. The amounts of the additives used are usually about 500 to 2,000 ppm, although the amounts may be varied depending upon the particular additives. The additives may be added in any convenient manner.

The bulk polymerization product with a conversion of below 20% by weight is in the form of a slurry containing not more than about 20% by weight of a polymer dispersed in the unreacted monomer. This slurry may be introduced, as it is, into the vapor phase polymerization system. Alternatively, the slurry may be subjected to separation and the separated polymer in a finely divided powder form is introduced to the vapor phase polymerization. The finely divided polymer powder so separated from the unreacted monomer has an apparent density of 0.05 to 0.3 gr/ml and uniform size and shape.

If the polymer slurry is intended to be used in applications other than the seed polymer particles in the vapor phase polymerization, the bulk polymerization may be further continued to raise the conversion.

The vapor phase polymerization may be carried out in a known manners. The polymerization temperature is usually in the range of from 40° to 80° C. The polymerization time is not critical and may be varied preferably within the range of from one to ten hours. The polymerization initiator may be further added to the vapor phase polymerization, or it may not be added thereto. The initiator used and the amount thereof may be similar to those explained hereinbefore in the bulk polymerization.

The polymerization pressure in the vapor phase polymerization system should be lower than the saturated vapor pressure ($P_s$) of the monomer at the polymerization temperature employed. In general, the polymerization pressure ($P_p$) may be such that the pressure ratio of $P_p/P_s$ is in the range of from 0.7 to 0.99. When the pressure ratio is too small, the productivity is reduced. In contrast, when the pressure ratio is excessively high, undesirable polymer scales or blocks are liable to be formed in the polymerization system.

The vapor phase polymerization may be carried out in either a batch-wise or continuous manner. During the vapor phase polymerization, the seed polymer particles are maintained in a fluidized state, for example, by means of mechanical stirring or forcing a gas such as gaseous monomer to flow.

The polymer product obtained by the vapor phase polymerization process of the invention exhibits improved uniformity in the particle size and shape, and therefore, has improved processability and moldability.

The invention will be further described by the following examples and comparative examples, in which percents are by weight unless otherwise specified.

[Bulk Polymerization]

EXAMPLE 1

Using a 100 liter volume vertical type reactor provided with baffles and an agitator with paddle wings, vinyl chloride was polymerized as follows.

After the reactor was deaerated, the reactor was charged with 40 kg of vinyl chloride and 12 g of ethyl cellulose having a degree of substitution of 2.5 (supplied by Hercules Co., the same as the ethyl cellulose used in the succeeding examples). The monomer charge was heated and, when the temperature reached 59° C., a solution of 2 g acetylcyclohexylsulfonyl peroxide in vinyl chloride was added to the monomer charge. Polymerization was carried out at 59° C. while the charge was agitated at 540 r.p.m. over a period of 1.5 hours. The polymerization product in a slurry form withdrawn from the reactor was separated into solid polymer particles and unreacted monomer.

The polymerization conversion, and the particle size distribution and apparent density of the polymer particles are shown in Table I, below.

The particle size distribution was determined by sieve analysis and expressed in the amounts (% by weight) of polymer particles passing through the respective meshes of the sizes shown in the Table.

EXAMPLE 2

Following a procedure similar to that set forth in Example 1, vinyl chloride was polymerized wherein the amount of ethyl cellulose added was 4 g instead of 12 g and the revolution number of the agitator was 740 r.p.m. Instead of 540 r.p.m. The resultant polymer particles exhibited the characteristics shown in Table I, below.

Comparative Examples 1 and 2

The procedures set forth in Examples 1 and 2 were repeated wherein no ethyl cellulose was added, with all other conditions remaining substantially the same. The resultant polymers exhibited the characteristics shown in Table I, below.

EXAMPLE 3

The same reactor as that used in Example 1 was used. After the reactor was deaerated, it was charged with 40 kg of vinyl chloride, 8 g of ethyl cellulose and 8 g of stearyl alcohol. The monomer charge was heated and, when the temperature reached 59° C., a solution of 4 g 2,2'-azobis-(4-methoxy-2,4-dimethylvaleronitrile) in vinyl chloride was added to the monomer charge to start polymerization. The polymerization was carried out at 59° C., for a period of 2 hours, while the charge was agitated at 740 r.p.m. The product slurry was separated into solid particles and unreacted monomer.

The polymer particles exhibited the characteristics shown in Table I, below.

Comparative Example 3

Following a procedure similar to that set forth in Example 3, vinyl chloride was polymerized wherein no ethyl cellulose was added. The resultant polymer particles exhibited the characteristics shown in Table I, below.

EXAMPLE 4

Following a procedure similar to that set forth in Example 3, vinyl chloride was polymerized, wherein 8 g of polyethylene was used instead of stearyl alcohol and 6.5 g of methyl cellulose, having a degree of substitution of 2.8, was used instead of 8 g of ethyl cellulose. The resultant polymer particles exhibited the characteristics shown in Table I, below.

EXAMPLE 5

Following a procedure similar to that set forth in Example 3, vinyl chloride was polymerized, wherein 4 g of calcium stearate was used instead of 8 g of stearyl alcohol. The resultant polymer particles exhibited the characteristics shown in Table I, below.

EXAMPLE 6

The same reactor as that used in Example 1 was used. After the reactor is deaerated, it was charged with 40 kg of vinyl chloride, 600 g of vinyl acetate and 6.5 g of methyl cellulose having a degree of substitution of 2.8. The monomer charge was heated and, when the temperature reached 65° C., a solution of 2 g of acetylcyclohexylsulfonyl peroxide in vinyl chloride was added to the monomer charge to start polymerization. Polymerization was carried out at 65° C., for a period of 1.5 hours, while the charge was agitated at 740 r.p.m. The product slurry was separated into solid polymer particles and unreacted monomer. The polymer particles exhibited the characteristics shown in Table I, below.

EXAMPLE 7

The same reactor as that used in Example 1 was used. After the reactor was deaerated, it was charged with 40 kg of vinyl chloride, 300 g of ethylene-vinyl acetate copolymer (trade name: "Ultrathene #630", supplied by Toyo Soda MFG. Co.) and 8 g of ethyl cellulose. The monomer charge was heated and, when the temperature reached 63° C., a solution of 4 g 2,2'-azobis-(4-methoxy-2,4-dimethylvaleronitrile in vinyl chloride was added to the monomer charge to start polymerization. Polymerization was carried out at 63° C., for a period of 2.5 hours, while the charge was agitated. The product slurry was separated into solid polymer particles and unreacted monomer. The polymer particles exhibited the characteristics shown in Table I, below.

EXAMPLE 8 and Comparative Example 4

A 5 liter volume vertical type reactor provided with an agitator having paddle wings was used. After the reactor was deaerated, it was charged with 3 kg of vinyl chloride and 0.9 g of ethyl cellulose. The monomer charge was heated and, when the temperature reached 59° C., a solution of 0.3 g of 2,2'-azobis-(4-methoxy-2,4-dimethylvaleronitrile) in vinyl chloride was added to the monomer charge. The polymerization was carried out at 59° C., for 2 hours, while the monomer charge was agitated at 900 r.p.m. The conversion was 9%. The slurry so produced was transferred to a 20 liter volume horizontal type reactor provided with an agitator having frame type wings, which reactor was previously charged with 9 kg of vinyl chloride and 1.5 g of t.-butylperoxyneodecanoate. Immediately after the transfer of slurry, the charge in the horizontal type reactor was heated, and maintained at 59° C. for a period of 9 hours while the charge was agitated at 70 r.p.m. The polymer slurry so produced was subjected to separation and 10 kg of polymer particles were obtained. The polymer particles exhibited the characteristics shown in Table I, below.

For comparison purposes, the above mentioned procedure was repeated, wherein no ethyl cellulose was used, with all other conditions remaining substantially the same. The resultant polymer particles exhibited the characteristics shown in Table I, below.

of polymerization. The polymer had a bulk density of 0.57 kg/cm$^3$ and a specific viscosity ($\eta$ sp) of 0.362.

For comparison purposes, the above-mentioned procedure was repeated, wherein no ethyl cellulose was used in the bulk polymerization stage, with all other conditions remaining substantially the same. The resultant polymer had a bulk density of 0.57 g/cm$^3$ and a specific viscosity ($\eta$ sp) of 0.362.

Table I

| | Conversion (%) | Particle size distribution (%) | | | | | | | | Apparent density (g/ml) |
|---|---|---|---|---|---|---|---|---|---|---|
| | | 500μ | 420μ | 297μ | 250μ | 210μ | 177μ | 149μ | 105μ | |
| Example 1 | 8 | 99 | 99 | 99 | 99 | 97 | 93 | 79 | 33 | 0.11 |
| Example 2 | 8 | 99 | 99 | 99 | 99 | 99 | 96 | 89 | 38 | 0.12 |
| Comparative Example 1 | 9 | 99 | 99 | 99 | 96 | 76 | 28 | 6 | 1 | 0.19 |
| Comparative Example 2 | 8 | 99 | 99 | 98 | 97 | 79 | 43 | 18 | 7 | 0.14 |
| Example 3 | 8 | 99 | 99 | 97 | 94 | 91 | 84 | 65 | 20 | 0.11 |
| Comparative Example 3 | 7 | 99 | 98 | 92 | 84 | 72 | 47 | 29 | 3 | 0.10 |
| Example 4 | 7 | 99 | 99 | 98 | 96 | 92 | 80 | 55 | 10 | 0.11 |
| Example 5 | 9 | 99 | 98 | 96 | 93 | 90 | 78 | 51 | 8 | 0.10 |
| Example 6 | 7 | 99 | 99 | 98 | 95 | 89 | 76 | 54 | 15 | 0.19 |
| Example 7 | 8 | 99 | 99 | 99 | 97 | 94 | 89 | 74 | 21 | 0.15 |
| Example 8 | | 99 | 99 | 99 | 99 | 97 | 92 | 79 | 28 | 0.53 |
| Comparative Example 4 | | 99 | 98 | 97 | 95 | 91 | 79 | 42 | 6 | 0.54 |

[Bulk and succeeding vapor phase polymerizations]

EXAMPLE 9 and Ccomparative Example 5

Using a 30 liter volume vertical type reactor provided with baffles and an agitator having paddle wings, vinyl chloride was polymerized under bulk conditions as follows.

After the reactor was deaerated, it was charged with 15 kg of vinyl chloride and 4.5 g of ethyl cellulose. The monomer charge was heated and, when the temperature reached 59° C., a solution of 0.9 g acetylcyclohexaesulfonyl peroxide in vinyl chloride was added to the monomer charge. The polymerization was carried out at 59° C., for a period of 1.5 hours, while the charge was agitated at 600 r.p.m. The conversion was 8%. Immediately after the termination of polymerization, the polymer slurry so produced was cooled to below 30° C.

A solution of 4 g 2,2'-azobis-(2,4-dimethylvaleronitrile) in vinyl chloride was added to the cooled polymer slurry. Then, the polymer shurry was pumped into a 100 liter volume autoclave provided with an agitator having double helical type wings and maintained at an elevated temperature. Upon introduction of the polymer slurry into the heated autoclave, the polymer slurry broke up into spray whereby the unreacted monomer was vaporized and polymer particles were maintained in fluidized state by the agitator rotating at 200 r.p.m. The pumping of the polymer slurry was continued over a period of 1.5 hours. Thus, the vapor phase polymerization was conducted under conditions such that the polymerization temperature, pressure and time were 57° C., 7.1 kg/cm$^2$G and 6 hours, respectively. In order to remove the heat of polymerization, an additional monomer was continuously forced with a pump into the autoclave over the period of polymerization, where the monomer broke up into spray. The pressure within the autoclave was maintained constant by a pressure controller, while the amount of the gaseous monomer which was above that required to maintain the constant pressure was withdrawn from the autoclave and recovered. 10.5 kg of a polymer were obtained by the 6 hours The polymers of the above-mentioned example and comparative example exhibited particle size distributions shown in Table II, below.

EXAMPLE 10 and Comparative Example 6

The procedures set forth in Example 9 and Comparative Example 5 were repeated, wherein the agitator provided in the 30 liter volume reactor was rotated at 900 r.p.m. instead of 600 r.p.m. In Example 10, 4.0 g of methyl cellulose was used, instead of 4.5 g of ethyl cellulose, in the bulk polymerization stage. All other conditions remained substantially the same. In both Example 10 and Comparative Example 6, the yield of polymers was 10.7 kg, and the polymers exhibited a bulk density of 0.56 g/cm$^3$ and a specific viscosity ($\eta$ sp) of 0.362. The particle size distributions of these polymers are shown in Table II, below.

EXAMPLE 11 and Comparative Example 7

The same 30 liter volume reactor and 100 liter volume autoclave as those used in Example 9 were used.

After the 30 liter volume reactor was deaerated, it was charged with 15 kg of vinyl chloride, 100 g of ethylene-vinyl acetate copolymer similar to that used in Example 7 and 4.5 g of ethyl cellulose. The monomer charge was heated and, when the temperature reached 63° C., a solution of 2.0 g 2,2'-azobis-(4-methoxy-2,4-dimethylvaleronitrile) in vinyl chloride was added to the monomer charge to start polymerization. The polymerization was carried out at 63° C. for 2.5 hours while the charge was agitated at 900 r.p.m. Immediately after the termination of polymerization, the polymer slurry so produced was cooled to below 30° C. The conversion was 7%.

A solution of 5 g 2,2'-azobis-(2,4-dimethylvaleronitrile) in vinyl chloride was added to the cooled polymer slurry. Then, the polymer slurry was pumped into the 100 liter volume autoclave. Following a procedure set forth in Example 9, vapor phase polymerization was carried out under conditions such that the polymerization temperature, pressure and time were 61° C., 8 kg/cm$^2$G and 6 hours, respectively. A liquid vinyl chloride having incorporated therein one percent of ethylene-vinyl acetate copolymer was continuously forced into the autoclave over the period of polymerization for the removal of the heat of polymerization. About 10 kg of a polymer were obtained by the 6 hours of polymerization. The polymer had a bulk density of 0.64 g/cm$^3$.

For comparison purposes, the above-mentioned procedure was repeated, wherein no ethyl cellulose was used in the bulk polymerization step, with all other conditions remaining substantially the same. About 10 kg of a polymer were obtained. The polymer had a bulk density of 0.64 g/cm$^3$. The particle size distributions of these polymers are shown in Table II, below.

EXAMPLE 12 and Comparative Example 8

Using a reactor of a type similar to that used in Example 9 and following a procedure similar to that set forth in Example 9, vinyl chloride was polymerized under bulk conditions. The amounts of vinyl chloride, ethyl cellulose and acetylcyclohexanesulfonyl peroxide were 40 kg, 4 g and 3 g, respectively. The polymerization time was 2 hours and the rate of revolution of the agitator was 740 r.p.m. Immediately after the termination of polymerization, the polymer slurry so produced was cooled to below 30° C.

A solution of 10 g 2,2'-azobis-(2,4-dimethylvaleronitrile) in vinyl chloride was added to the polymer slurry. Then, the polymer slurry was pumped into a vapor phase polymerization apparatus. The polymerization apparatus comprised a vertical single stage fluidized bed and batch-wise polymerization reactor having a diameter of 500 m. The reactor was provided with a horizontal perforated tray having an open area of about 3% on which a fluidized bed of polymer particles was formed. The fluidized bed reactor was provided with a heat exchanger tube within the fluidized bed.

The polymer slurry was introduced into the space above the fluidized bed, in which space the polymer slurry was broken up into a spray and fell on the fluidized bed. Gaseous vinyl chloride was forced to flow upwardly as carrier gas through the perforated tray to fluidized the bed of polymer particles on the tray. The superficial rate of flow of the fluidizing gas was adjusted in the range of from 0.05 to 0.3 m/sec. In the initial period of about two hours from the start of the introduction of the polymer slurry, the introducing rate of the polymer slurry and the flow rate of the fluidizing gas were controlled so as to be relatively low. When a uniform fluidized state was obtained, the flow rate of the fluidizing gas and the introducing rate of the slurry were gradualy increased to the desired values, and the flow rate of the fluidizing gas was controlled so that the uniform fluidized state was not destroyed. The intoducing rate of the polymer slurry was controlled so that no liquid monomer remained in the fluidized bed, that is, the unreacted monomer in the introduced polymer slurry immediately vaporized. The polymerization temperature (the fluidized bed temperature), pressure and time were 57° C., 7.1 kg/cm$^2$G and 9 hours, respectively. The polymerization pressure was maintained constant by using a pressure adjusting means, while the amount of gaseous monomer which was above that required to maintain the constant pressure was withdrawn from the reactor and recovered. An additional liquid monomer was continuously introduced into the reactor in an amount equal to the amount of the monomer exhausted during the polymerization. The introduced additional liquid monomer was broken up into a spray inside the reactor.

The introduction of the polymer slurry was completed four hours after the start of its introduction. No additional initiator was used. The heat of polymerization was removed by circulating cooling water through the heat exchanger tubes located in the fluidized bed. The termperature of the cooling water flowing through the heat exchange tube was controlled by using a temperature adjusting means. The temperature of the cooling water, as measured at the entrance of the heat exchanger tube, varied within the range of from 27° to 50° C.

After the nine hours polymerization in the fluidized bed reactor, 21 kg of polymer particles were obtained. The amount of the polymer slurry introduced into the fluidized bed reactor was 35 kg. The conversion in the vapor phase polymerization was found to be 9%. The polymer exhibited a bulk density of 0.57 g/cm$^3$ and a specific viscosity ($\eta$ sp) of 0.362. The particle size distribution of the polymer particles is shown in Table II, below.

For comparison purposes, the above-mentioned procedure for the bulk and vapor phase polymerization was repeated, wherein no ethyl cellulose was used in the bulk polymerization stage, with all other conditions remaning substantially the same. Thus, 20 kg of polymer particles was obtained. The polymer exhibited a bulk density of 0.57 g/cm$^3$ and a specific viscosity ($\eta$ sp) of 0.362. The particle size distribution of the polymer particles is shown in Table II, below.

Table II

| | Particle size distribution (%) | | | | | | | |
|---|---|---|---|---|---|---|---|---|
| | 500μ | 420μ | 297μ | 250μ | 210μ | 177μ | 149μ | 105μ |
| Example 9 | 99 | 99 | 98 | 95 | 90 | 79 | 42 | 10 |
| Comparative Example 5 | 97 | 95 | 92 | 86 | 77 | 43 | 16 | 2 |
| Example 10 | 99 | 99 | 98 | 96 | 92 | 86 | 71 | 23 |
| Comparative Example 6 | 98 | 97 | 94 | 91 | 86 | 77 | 45 | 8 |
| Example 11 | 99 | 98 | 97 | 94 | 86 | 69 | 31 | 8 |
| Comparative Example 7 | 97 | 95 | 93 | 89 | 78 | 51 | 19 | 3 |
| Example 12 | 99 | 98 | 96 | 92 | 81 | 55 | 16 | 5 |
| Comparative Example 8 | 96 | 93 | 90 | 85 | 72 | 44 | 12 | 1 |

What we claim is:

1. In a process for polymerizing a monomer selected from the group consisting of vinyl chloride and combinations of at least about 90% by weight of vinyl chloride with not more than about 10% by weight of at least one copolymerizable monoethylenically unsaturated monomer, in the vapor phase, maintained at a pressure lower than the vapor pressure of the monomer at the polymerization temperature employed, and in the presence of seed vinyl chloride polymer particles, the seed vinyl chloride polymer being a homopolymer or a copolymer comprised of at least about 90% by weight of units derived from vinyl chloride and not more than about 10% by weight of units derived from at least one copolymerizable monoethylenically unsaturated monomer, the improvement which comprises:

using, as the seed vnyl chloride polymer particles, a vinyl chloride polymer prepared by bulk polymerization conducted in the presence of 0.001% to 2% by weight, based on the weight of te monomer, of a cellulose ether soluble in the monomer.

2. A process according to claim 1 wherein the amount of the cellulose ether is 0.005% to 0.1% by weight, based on the weight of the monomer.

3. A process according to claim 1 wherein the cellulose ether has the hydroxyl groups substituted with an alkylating or hydroxyalkylating agent having 1 to 3 carbon atoms.

4. A process according to claim 1 wherein the cellulose ether is selected from the group consisting of methyl cellulose ad ethyl cellulose.

5. A process according to claim 1 wherein the cellulose ether has a degree of substitution of from 0.1 to 2.8.

6. A process according to claim 1 wherein the bulk polymerization is completed before the conversion reaches 20%.

7. A process according to claim 1 wherein the vapor phase polymerization is conducted while a polymer slurry comprising the vinyl chloride polymer and the unreacted monomer, formed by the bulk polymerization, is introduced into a zone of the vapor phase polymerization.

8. A process for polymerizing a monomer selected from the group consisting of vinyl chloride and combinations of at least about 90% by weight of vinyl chloride with not more than about 10% by weight of at least one copolymerizable monoethylenically unsaturated monomer, which comprises polymerizing the monomer under bulk conditions in the presence of 0..001% to 2% by weight, based on the weight of the monomer, of a cellulose ether soluble in the monomer.

9. A process according to claim 8 wherein the amount of the cellulose ether is 0.005% to 0.1% by weight, based on the weight of the monomer.

10. A process according to claim 8 wherein the cellulose ether has the hydroxyl groups substituted with an alkylating or hydroxyalkylating agent having 1 to 3 carbon atoms.

11. A process according to claim 8 wherein the cellulose ether is selected from the group consisting of methyl cellulose and ethyl cellulose.

12. A process according to claim 8 wherein the cellulose lose ether has a degree of substitution of from 0.1 to 2.8.

* * * * *